(No Model.)

A. R. BOLUSS.
VALVE FOR AIR BRAKES.

No. 436,299. Patented Sept. 9, 1890.

Witnesses:
D. W. Gardner
E. A. Finchel

Inventor:
Alfred R. Boluss
By Ernest C. Webb Atty

UNITED STATES PATENT OFFICE.

ALFRED R. BOLUSS, OF NORWOOD, OHIO.

VALVE FOR AIR-BRAKES.

SPECIFICATION forming part of Letters Patent No. 436,299, dated September 9, 1890.

Application filed October 29, 1889. Renewed August 21, 1890. Serial No. 362,567. (No model.)

*To all whom it may concern:*

Be it known that I, ALFRED R. BOLUSS, a citizen of the United States, residing at Norwood, in the county of Hamilton, in the State of Ohio, have invented certain new and useful Improvements in Valves for Air-Brakes, of which the following is a description.

My invention relates to an improved form of engineer's valve, particularly designed for use in connection with an automatic air-brake system for railway-trains; and it has for its object the production of a valve which will automatically operate when released to apply the air-pressure to the brakes to stop the train.

Figure 1:
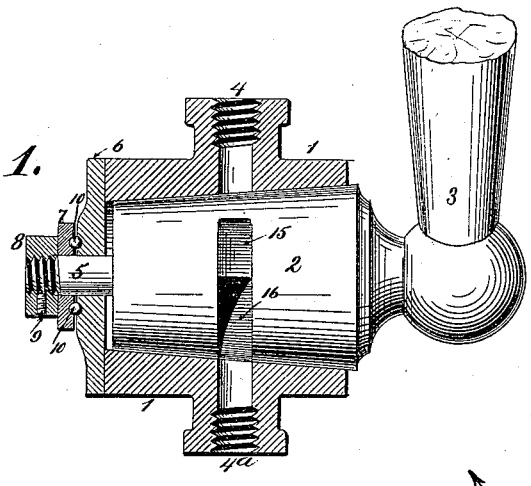
Figure 2:
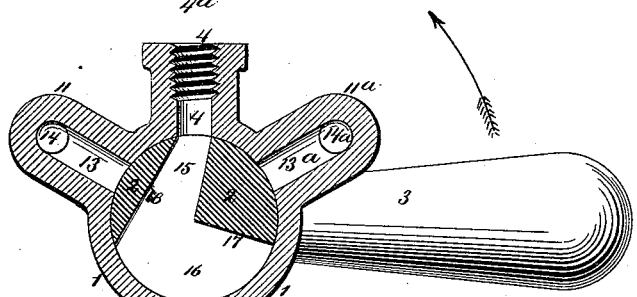
Figure 4:
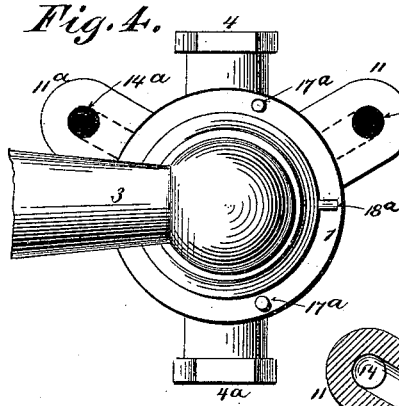
Figure 5:
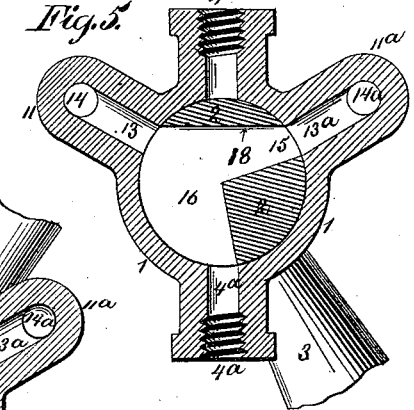
Figure 3:
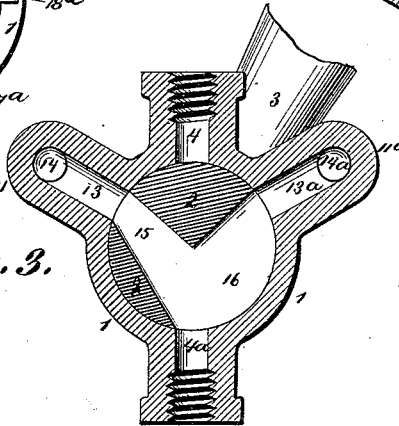

In the accompanying drawings, in the several figures of which like parts are designated by similar reference-numerals, Figure 1 is a longitudinal sectional elevation of the valve, showing the washers and arrangement for holding the valve in its seat. Fig. 2 is a cross-section of the valve, showing the valve in its normal position. Fig. 3 is a cross-section showing the valve when automatically thrown over to the safety position. Fig. 4 is a front view of the valve, showing the stops to limit its motion; and Fig. 5 is a cross-section of the valve in its position when positively rotated.

In the drawings, 1 is the valve-case. 2 is the valve proper, operated by the lever 3. The valve 2 is ground to fit its case and is held in place by washers 6 and 7, nut 8, and set-screw 9, the nut 8 being fastened to an extension 5 of the valve 2. Between the washers 6 and 7 are arranged small balls 10, which are placed in circular grooves in the surfaces of the washers. These balls or spheres permit the valve 2 to turn easily in its case with the least possible amount of friction and yet keep it tight, so that it cannot leak.

11 and 11$^a$ are extensions on the case 1, through which are the ports 13 14 and 13$^a$ 14$^a$, which communicate with the outer air.

4$^a$ and 4 are ports connected, respectively, with the source of power—such as compressed air—and the place of application of such power—such as a brake-cylinder. The body of the valve 2 is cut away, as shown, to form ways 16 15. In the position shown in Fig. 2 the valve is so turned that the compressed air may pass freely from port 4$^a$ through ways 16 15 to port 4 and the ports 13 and 13$^a$ are closed. It will be noticed that valve 2, as shown, is of such shape that the way 15 is entirely at one side of the center of rotation of the valve and its wall 18 stands obliquely to the line of travel of the air, and so offers but little resistance to it, while the wall 17 of way 16 is on one side of the center of rotation and stands substantially at right angles to the line of travel of the air, and so offers large resistance to it, whereby the valve will be caused normally to rotate in the direction of the arrow when the engineer releases his hold of the handle. The valve-handle 3 in actual use is held constantly by the engineer in the position shown in Fig. 2. In this position the pressure of the compressed air will be transmitted from port 4$^a$ through ways 16 15 and port 4, and the brakes would be off, and would remain off, so long as the engineer kept his hand on lever 3 and kept it in the position shown in Fig. 2. If for any cause he should let go of lever 3, the difference of pressure area between 17 and 18 would cause the valve 2 to rotate automatically in the direction of the arrow, and it would then be in the position shown in Fig. 3, the air exhausting to the atmosphere through ports 14 and 14$^a$ and the brakes would be set. When the engineer desired to apply the brakes himself, he would move the lever 3 and valve 2 into the position shown in Fig. 5, and against the pressure tending to throw the valve to the position shown in Fig. 3. By this arrangement the valve is always under the control of the operator, to be set by him as he may choose, and yet, should anything occur to cause him suddenly to let go of the lever 3, the pressure of the air in use in the system will automatically throw the valve and set the brakes. It is obvious that a valve of this construction may be provided with packing, if desirable or necessary. It may also be provided on its case with two pins 17$^a$, with which a pin 18$^a$ on the valve 2 cooperates, to limit the movement of the valve.

What I claim is—

1. An engineer's valve for air-brakes, comprising a shell having an inlet-port and an outlet-port, and a suitable number of exhaust-ports, and a rotary plug or valve having two ways, one of which passes through the valve on a chord of its circle and the other is a sector merging into the first and having a radial wall standing at a sharp angle to the path leading from the inlet to the outlet, so as to interpose abruptly a large area of resistance to the passage of the fluid, whereby when the valve is unrestrained the fluid-pressure exerting its force against this superior resisting-surface will automatically turn the valve, substantially as described.

2. An engineer's valve for air-brake systems, comprising a shell having an inlet-port and an outlet-port, and two exhaust-ports, and a rotary plug or valve seated in said shell and provided with two ways, one of which extends through the valve on a chord of its circle and in its normal position opens communication between the inlet and outlet ports, and the other of which ways is a sector opening into the first way and having a wall extending crosswise at a sharp angle into the path of movement of the fluid through the inlet and outlet ports and affording an area of resistance superior to the first way to provide for the automatic operation of the valve when manually unrestrained to open communication between the main pipe and exhaust-ports and so set the brakes, and also adapted to be manually operated for the same purpose, and also for opening communication between the main reservoir and main pipes, substantially as described.

In testimony whereof I have hereunto set my hand.

ALFRED R. BOLUSS.

Witnesses:
JAC. C. LOWY,
ERNEST C. WEBB.